(12) United States Patent
Aughton et al.

(10) Patent No.: US 11,422,015 B2
(45) Date of Patent: Aug. 23, 2022

(54) ACOUSTIC TRANSDUCER ARRANGEMENT INCLUDING RESPECTIVE TRANSDUCER SET FOR EACH EDGE OF A NOTATIONAL REGULAR POLYGON

(71) Applicant: RUBICON RESEARCH PTY LTD, Hawthorn East (AU)

(72) Inventors: David John Aughton, Essendon (AU); Gordon John Bish, Thornbury (AU); Craig Joseph Bayliss, Box Hill North (AU); Marius Catalin Catrina, Southbank (AU)

(73) Assignee: RUBICON RESEARCH PTY LTD, Hawthorn East (AU)

( * ) Notice: Subject to any disclaimer, the term of this patent is extended or adjusted under 35 U.S.C. 154(b) by 389 days.

(21) Appl. No.: 16/478,694

(22) PCT Filed: Jan. 17, 2018

(86) PCT No.: PCT/AU2018/050028
§ 371 (c)(1),
(2) Date: Jul. 17, 2019

(87) PCT Pub. No.: WO2018/132870
PCT Pub. Date: Jul. 26, 2018

(65) Prior Publication Data
US 2019/0368908 A1    Dec. 5, 2019

(30) Foreign Application Priority Data

Jan. 17, 2017    (AU) .................................. 2017900133

(51) Int. Cl.
*G01F 1/66*    (2022.01)
*G01F 1/667*    (2022.01)
(Continued)

(52) U.S. Cl.
CPC .............. *G01F 1/667* (2013.01); *G01F 1/662* (2013.01); *G01F 23/296* (2013.01); *G01F 15/005* (2013.01)

(58) Field of Classification Search
None
See application file for complete search history.

(56) References Cited

U.S. PATENT DOCUMENTS 3,918,304 A    11/1975    Abruzzo et al.
4,102,186 A    7/1978    Brown
(Continued)

FOREIGN PATENT DOCUMENTS

AU    2012234917 A1    10/2012
CN    102455368 A    5/2012
(Continued)

OTHER PUBLICATIONS

First Office Action, for Chinese Application No. 201880013417.8, dated Aug. 17, 2020, 26 pages.
(Continued)

*Primary Examiner* — Harshad R Patel
(74) *Attorney, Agent, or Firm* — David D. Brush; Westman, Champlin & Koehler, P.A.

(57) ABSTRACT

An arrangement of acoustic transducers for a flow meter. The flow meter is for measuring the rate at which fluid is flowing. The arrangement includes a respective transducer set for each edge of a notional regular polygon. The transducer sets are associated with a tubular cavity for carrying the fluid. Each of the transducer sets respectively includes two acoustic transducers oriented to define an acoustic path lying in a measurement plane of the respective set, and another two acoustic transducers oriented to define another acoustic path lying in the measurement plane of the respective set. The transducers sets are positioned so that, in a
(Continued)

cross-section normal to the tubular cavity, the measurement plane of each respective transducer set is coincident with a respective edge of the notional regular polygon.

18 Claims, 8 Drawing Sheets

(51) Int. Cl.
*G01F 23/296* (2022.01)
*G01F 15/00* (2006.01)

(56) References Cited

U.S. PATENT DOCUMENTS

| | | | |
|---|---|---|---|
| 4,162,630 A | 7/1979 | Johnson | |
| 4,320,659 A * | 3/1982 | Lynnworth | G01F 1/66 73/290 V |
| 4,462,261 A | 7/1984 | Keyes | |
| 6,047,602 A * | 4/2000 | Lynnworth | G01F 1/662 73/632 |
| 8,291,773 B2 | 10/2012 | Dietz et al. | |
| 8,336,394 B2 * | 12/2012 | Laurent | G01F 1/667 73/861.29 |
| 9,304,024 B2 * | 4/2016 | Brown | G01F 25/0007 |
| 9,612,141 B2 * | 4/2017 | Ryu | G01F 15/18 |
| 11,047,721 B2 * | 6/2021 | Schob | G01N 11/04 |
| 11,156,488 B2 * | 10/2021 | Hies | G01F 1/662 |
| 2012/0090404 A1 | 4/2012 | Dietz et al. | |
| 2014/0191145 A1 * | 7/2014 | Aughton | F16K 1/2007 251/213 |
| 2016/0299225 A1 | 10/2016 | Upul et al. | |
| 2017/0307424 A1 * | 10/2017 | Hies | G10K 11/20 |

FOREIGN PATENT DOCUMENTS

| | | |
|---|---|---|
| CN | 205719136 U | 11/2016 |
| GB | 2318414 A | 4/1998 |
| WO | 9817977 A | 4/1998 |
| WO | 2009074162 A1 | 6/2009 |
| WO | 2010002432 A1 | 1/2010 |
| WO | 2011020143 A1 | 2/2011 |
| WO | 2016004471 A1 | 1/2016 |
| WO | 2016144585 A1 | 9/2016 |

OTHER PUBLICATIONS

Office Action, for Russian Application No. 201991560/31, dated Aug. 26, 2020, 4 pages.
Communication to Rules 70(2) and 70a(2) EPC for corresponding European Application No. 18741710.0, dated Oct. 9, 2020, 1 page.
Search report for corresponding European Application No. 18741710.0, dated Sep. 22, 2020, 9 pages.
International Search Report dated Apr. 4, 2018 for corresponding International Application No. PCT/AU2018/050028, filed Jan. 17, 2018.
Written Opinion of the International Searching Authority dated Apr. 4, 2018 for corresponding International Application No. PCT/AU2018/050028, filed Jan. 17, 2018.
International Preliminary Report on Patentability dated Mar. 4, 2019 for or corresponding International Application No. PCT/AU2018/050028, filed Jan. 17, 2018.
Reissue of International Preliminary Report on Patentability dated Apr. 30, 2019 for or corresponding International Application No. PCT/AU2018/050028, filed Jan. 17, 2018.
Chinese Office Action dated Apr. 15, 2021, for Chinese Application No. 201880013417.8.
English translation of the Chinese Office Action dated Apr. 15, 2021, for Chinese Application No. 201880013417.8, with English Claims.
Eurasian Office Action dated Mar. 31, 2021, for Application No. 201991560.
English translation of the Eurasian Office Action dated Mar. 31, 2021, for Application No. 201991560.
African Regional Intellectual Property Organization Search Report dated Jan. 20, 2021 for Application No. AP/P/2019/011767.
Chilean Examination Report dated Dec. 31, 2020 for Chilean Application No. 2019-001984.
Chilean Examination Report dated Jul. 9, 2020 for Chilean Application No. 2019-001984.
Chinese Office Action dated Nov. 3, 2021, for Chinese Application No. 201880013417.8.
English translation of the Chinese Office Action dated Nov. 3, 2021, for Chinese Application No. 201880013417.8.

* cited by examiner

ACOUSTIC TRANSDUCER ARRANGEMENT INCLUDING RESPECTIVE TRANSDUCER SET FOR EACH EDGE OF A NOTATIONAL REGULAR POLYGON

This Application is a Section 371 National Stage Application of International Application No. PCT/AU2018/050028, filed Jan. 17, 2018, published as WO 2018/132870 A1, on Jul. 26, 2018, in English, which is based on and claims the benefit of Australian Provisional Patent Application 2017900133, filed 17 Jan. 2017, the contents of which are hereby incorporated by reference in their entireties.

FIELD OF THE INVENTION

The invention relates to the measurement of flow rate.

The invention will be described in relation to the measurement of the rate at which irrigation water is flowing, although variants of the invention may be applied in other contexts, e.g. applied to the measurement of the rate at which a gas is flowing.

BACKGROUND TO THE INVENTION

A conventional method of measuring the rate at which water is flowing through a pipe entails the installation of a pair of acoustic transducers facing each other to define an acoustic path. The path traverses the tubular interior of the pipe at an angle of 45° to the central axis of the pipe and bisects that axis. Each of the transducers sends signals along, and receives signals from, the acoustic path. From the output of these transducers the transit time of these signals in each direction along the acoustic path can be determined. A difference between these transit times is relatable to the average axial velocity of the fluid within the pipe.

The computation of the velocity is based on the assumption that the flow is parallel to the central axis of the pipe and that a laminar flow profile exists. The relevant logic is derived using physical analysis.

In practice, these assumptions do not hold. Turbulence results in flow patterns having velocity components that are not parallel to the central axis and a flow profile that is not fully laminar. As such, turbulence within the pipe reduces the accuracy of the measurement.

For improved accuracy, it is conventional to include a second pair of acoustic transducers arranged to define a second acoustic path which intercepts, at 90°, the first-mentioned acoustic path at the center line of the pipe. The common plane occupied by the two acoustic paths is coincident with the center line of the pipe and is referred to as a measurement plane. Of course, only a practical degree of precision, rather than absolute geometric precision, is required and that is how "measurement plane" and similar terminology is used in this art and in this patent specification. By way of example, in the context of a Ø500 mm pipe, two acoustic paths which are crossed within one millimeter of each other are within a common plane as the wording is used herein.

Whilst the addition of a second acoustic path is an improvement, turbulence is still a source of inaccuracy. Accordingly, it remains desirable to minimise the turbulence reaching the flow meter. To this end it is common practice to provide:
on the upstream side of the flow meter, a straight run of pipe at least ten pipe-diameters long; and
on the downstream side of the flow meter, a straight run of pipe at least four pipe-diameters long.

In many applications, the installation of such a straight run of pipe is a costly inconvenience and/or further accuracy is desirable.

The initial applicant has previously developed improvements over these conventional approaches such as the improvements disclosed in the international patent applications published as WO 2011/020143 A1 and WO 2016/004471 A1.

WO 2011/020143 A1 (the contents of which are incorporated herein by reference) discloses an arrangement of acoustic transducers defining spaced, mutually parallel, stream wise measurement planes. It also discloses an arrangement of transducers defining a trio of stream wise measurement planes each of which intersects the center line of the pipe at a different angle so that the circular cross-section of the pipe is divided into six sectors.

WO 2016/004471 A1 (the contents of which are incorporated herein by reference) discloses a tubular cavity that is likewise divided by measurement planes into sectors. A gate valve sits downstream and adjacent to the arrangement of transducers. System identification is employed to relate flow rate, the position of the gate valve and the outputs of the transducers.

The expression "system identification" refers to the known technique of deriving a system model from experimental data. It consists of suggesting a suitable mathematical representation for the model of the system of interest, followed by a tuning process in which the particular representation is optimised so as to reproduce as closely as possible experimental timed observations from the system. The methodology provides a means of comparing different models and ranking them according to their ability to reproduce the system's behaviour. System identification is a particular sub-topic in mathematical system theory and also in statistics.

Despite the initial applicant's previous improvements, the present inventors have recognised that yet further improvements are possible. Preferred forms of the present invention aim to provide for improved accuracy and/or for simpler and more convenient construction.

A reference herein to a patent document or other matter which is given as prior art is not to be taken as an admission or a suggestion that the document or matter was known, or that the information it contains was part of the common general knowledge as at the priority date of any of the claims.

SUMMARY OF THE INVENTION

One aspect of the invention provides an arrangement of acoustic transducers for a flow meter;
the flow meter being for measuring the rate at which fluid is flowing;
the arrangement including a respective transducer set for each edge of a notional regular polygon;
the transducer sets being associated with a tubular cavity for carrying the fluid; each of the transducer sets respectively including
two acoustic transducers oriented to define an acoustic path lying in a measurement plane of the respective set; and
another two acoustic transducers oriented to define another acoustic path lying in the measurement plane of the respective set; and
the transducer sets being positioned so that, in cross-section normal to the tubular cavity, the measurement plane of each respective transducer set is coincident with a respective edge of the notional regular polygon.

A regular polygon is a planar shape consisting of a chain of straight line segments (referred to as "edges" or "sides") that is equiangular (all angles are equal in measure) and equilateral (all sides have the same length). Regular polygons may be convex or star. Triangles, squares, pentagons and hexagons, etc, are examples of convex regular polygons. Pentagrams and hexagrams are examples of star regular polygons.

Preferably the acoustic path of each respective set substantially crosses the other acoustic path of the respective set. Most preferably the acoustic path of each respective set is substantially perpendicular to the other acoustic path of the respective set. The notional regular polygon may be substantially concentric to the tubular cavity and is preferably convex. Most preferably the notional regular polygon is a square.

The measurement planes are preferably substantially parallel to the tubular cavity.

The arrangement may include transducer units each respective one of which carries two of the acoustic transducers and includes a mounting arrangement by which the respective one is mounted as a unit.

The arrangement may include a further four acoustic transducers oriented to define two acoustics paths lying in a plane coincident with a center line of the tubular cavity.

Preferably each upstream acoustic transducer, of the sets and of the further four acoustic transducers, lies in an upstream plane transverse to the tubular cavity; and each downstream acoustic transducer, of the sets and of the further four acoustic transducers, lies in a downstream plane transverse to the tubular cavity.

This aspect of the invention also provides an arrangement of hardware including the arrangement of acoustic transducers and a sensor for sensing a level of the fluid in the tubular cavity.

This aspect of the invention also provides an assembly for a flow meter including the arrangement; and a body defining the tubular cavity and carrying the acoustic transducers.

Preferably the body defines a respective mounting face portion for each of the acoustic transducers of the sets; each of the mounting face portions being substantially normal to a respectively corresponding edge portion of the notional regular polygon.

This aspect of the invention also provides a flow meter including the arrangement; and a logic arrangement for applying logic to outputs from the transducers to produce an indication of the rate at which the fluid is flowing.

Preferably the logic is at least partly determined by system identification.

This aspect of the invention also provides a transducer unit for a flow meter; the flow meter being for measuring the rate at which fluid is flowing; the transducer unit including
  an acoustic transducer to send signals along, and receive signals from, an acoustic path;
  another acoustic transducer to send signals along, and receive signals from, another acoustic path; and
  a mounting arrangement by which the transducer unit is mountable as a unit and in association with a tubular cavity for carrying the fluid;
the acoustic paths mutually diverging away from the transducer unit at orientations, relative to the mounting arrangement, such that an upstream at least three of the transducer units are co-operable with
  a downstream at least three of the transducer units and
  a body defining the tubular cavity to form the arrangement.

Preferably the acoustic paths mutually diverge away from the transducer unit at an included angle of 60° such that an upstream four of the transducer units is co-operable with a downstream four of the transducer units and the notional regular polygon is a square.

In another aspect there is provided an arrangement of acoustic transducers in a flow meter for water irrigation; the flow meter being for measuring the rate at which water is flowing; the arrangement including a respective transducer set for each edge of a notional regular polygon; the transducer sets being associated with a tubular cavity for carrying the water; each of the transducer sets respectively including
  two acoustic transducers oriented to define an acoustic path with each other and lying in a measurement plane of the respective set; and
  another two acoustic transducers oriented to define another acoustic path with each other and lying in the measurement plane of the respective set; and
the transducer sets being positioned so that, in cross-section normal to the tubular cavity, the measurement plane of each respective transducer set is coincident with a respective edge of the notional regular polygon.

BRIEF DESCRIPTION OF DRAWINGS

An embodiment of the apparatus will now be described by way of example only with reference to the accompanying drawings in which.

DETAILED DESCRIPTION

FIGS. 1 to 4 illustrate an assembly 1, for a flow meter, incorporating a tubular body 3 and an arrangement 5 of acoustic transducers.

Figure 1:
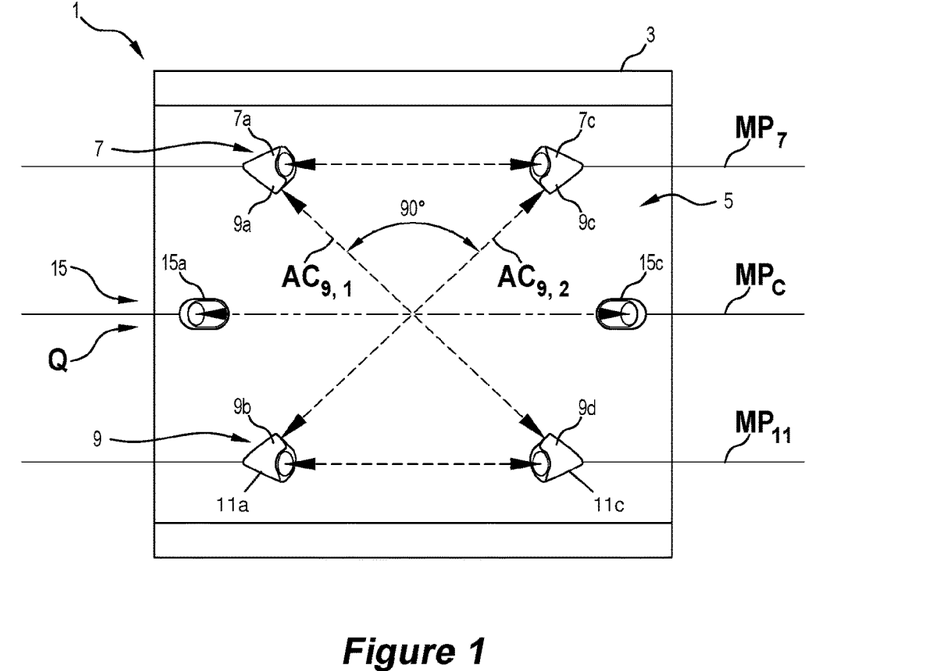
FIG. 1 is an axial cross-section view of an assembly for a flow meter.
Figure 2:
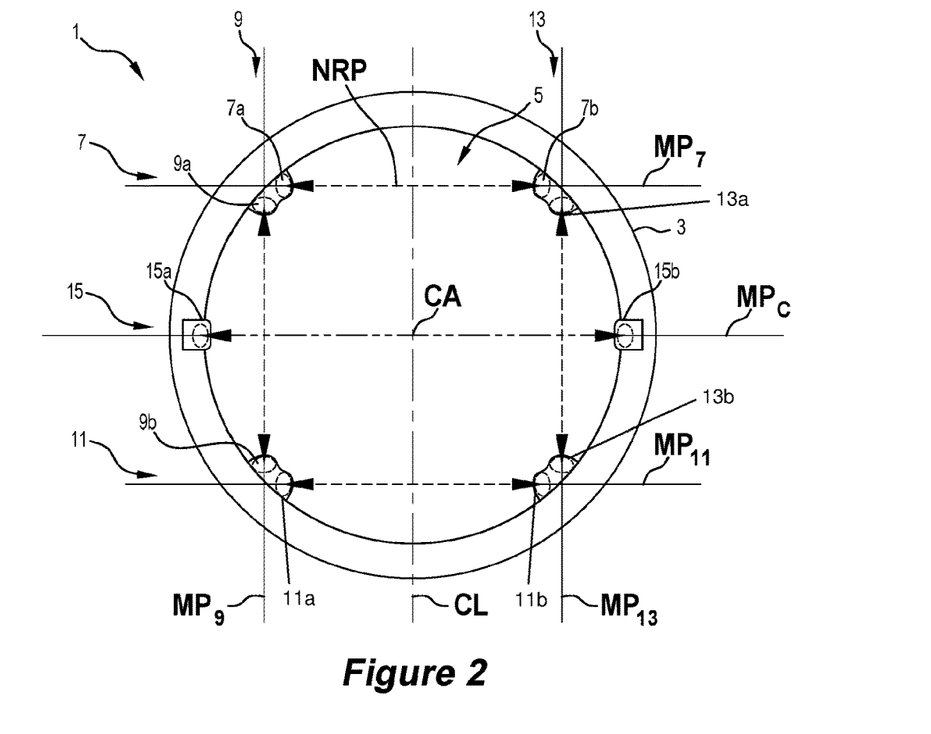
FIG. 2 is an end view of the assembly.
Figure 3:
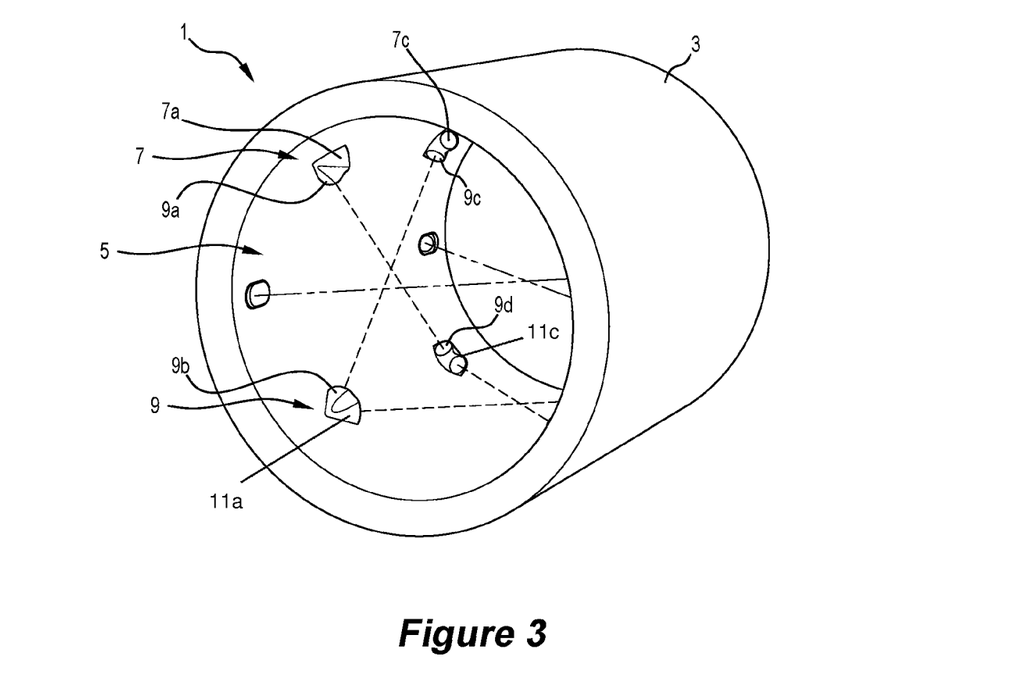
FIG. 3 is a perspective view of the assembly.
Figure 4:
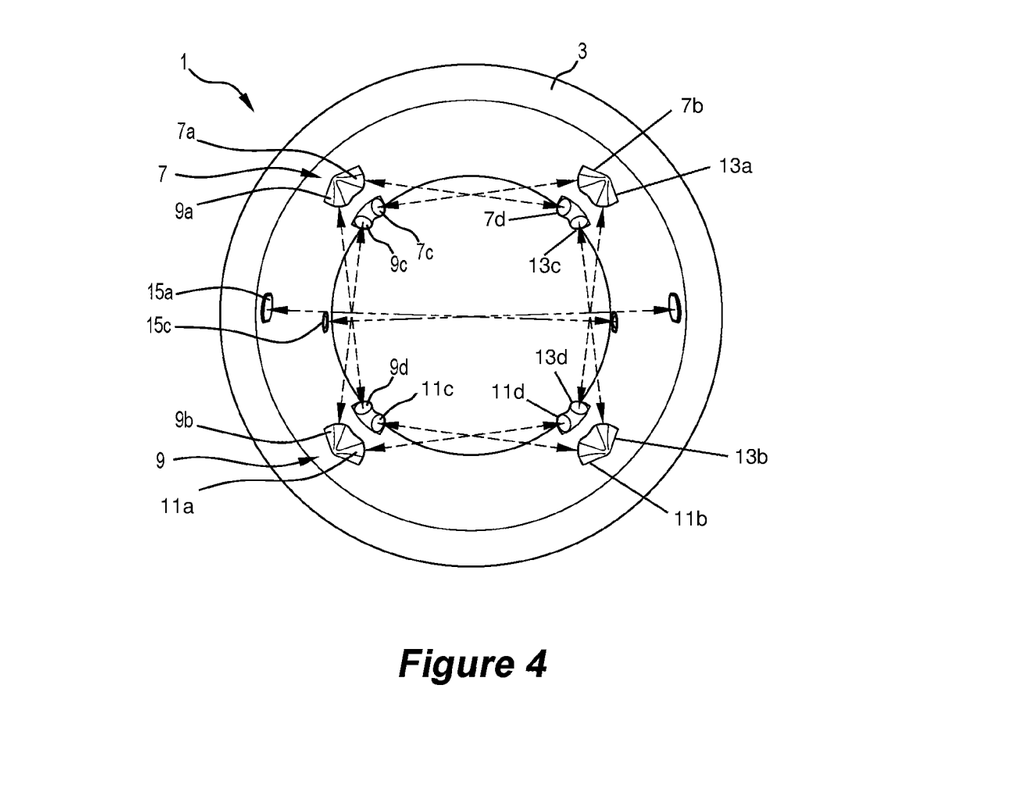
FIG. 4 is a more acute perspective view of FIG. 3.

The body 3 defines a tubular cavity through which the water flows. In this case the tubular cavity has a diameter of ØD. The body 3 may have mounting features (such as mounting flanges) within one diameter D upstream and downstream of the transducers to enable the assembly to be conveniently installed along a length of a pipe. Alternatively, the transducers may be otherwise mounted so as to measure the flow through the tubular cavity of the pipe per se. Variants of the disclosed arrangement may be employed in the context of non-circular pipes.

The arrangement 5 includes three sets 7, 9, 11, 13 of acoustic transducers.

Preferred forms of the arrangement 5 are useful for measuring flow in either direction, although for present purposes a flow in the direction of the arrow Q in FIG. 1 will be considered.

The set 7 includes transducers 7a, 7b, 7c, 7d mounted in proximity to the interior of the body 3. An upstream one 7a of those transducers co-operates with a downstream one 7d (FIG. 4) to define an acoustic path diagonally across a planar top chord of the cylindrical cavity of the body 3. The other upstream one 7b of those transducers sits symmetrically to the transducer 7a on the other side of the arrangement's vertical (as drawn) center line CL in the same transverse plane as the transducer 7a and in the same axial plane as the transducer 7d. The transducer 7b co-operates with a downstream one 7c of the transducers to define another acoustic path. Both acoustic paths defined by the set 7 lie in a common measurement plane MP7. The transducers 7a, 7b, 7c, 7d are thus located at the corners of a notional square across which the acoustic paths diagonally extend from corner to corner.

The set 9 includes acoustic transducers 9a, 9b, 9c, 9d. The transducer 9a sits adjacent to the transducer 7a and the transducer 9c likewise sits adjacent to the transducer 7c. Transducers 9b, 9d sit vertically below the transducers 9a, 9c respectively. The transducer 9a co-operates with the transducer 9d to define an acoustic path $AC_{9,1}$ diagonally traversing a vertical chord of the interior of the body 3. The transducers 9b, 9c likewise co-operate to define a second acoustic path $AC_{9,2}$ diagonally across the same chord. These paths are preferably mutually perpendicular as suggested in FIG. 1.

The paths $AC_{9,1}$, $AC_{9,2}$ lie in a common measurement plane MP9. The sets 11 and 13 likewise define measurement planes $MP_{11}$, $MP_{13}$.

In cross-section transverse to the interior of the body 3 (which corresponds to FIG. 2), the measurement planes each run along a respective edge of a notional regular polygon NRP in the form of the square. The vertices of the polygon NRP are defined by the points at which two of the measurement planes mutually intersect.

The exemplary arrangement 5 further includes a set 15 of acoustic transducers 15a, 15b, 15c, 15d defining a crossed pair of acoustic paths coincident with a central axis CA of the tubular interior of the body 3 to define a central measurement plane MPC. In this example, the central measurement plane MPC is horizontal.

The present inventors have found that the described construction is both computationally and constructionally advantageous.

The acoustic transducers are configured to produce outputs to which logic can be applied to determine the mean axial velocity of the fluid along each of the measurement planes. Whilst the logic applicable may vary from arrangement to arrangement and depend on the nature of the flowing fluid, the inventors' laboratory experiments have shown that surprisingly accurate flow measurements can be obtained by applying, to the output of the transducers, logic that has been developed by system identification.

The disclosed arrangement of acoustic transducers has been found to account for spiraling flow conditions, known as swirl, better than existing sensing arrangements. Swirl is one aspect of turbulence.

Conventional transit time-based flow measurement entails acoustic paths transecting the central axis of the pipe and is based on assumptions regarding the flow profile within the pipe. The disclosed preferred arrangement of acoustic transducers includes acoustic paths which do not transect the central axis to provide the data necessary to compensate for swirl.

Preferred forms of the invention are particularly advantageous in the context of circular pipes (i.e. pipes of circular cross-section) where swirl is more problematic.

Figure 5:
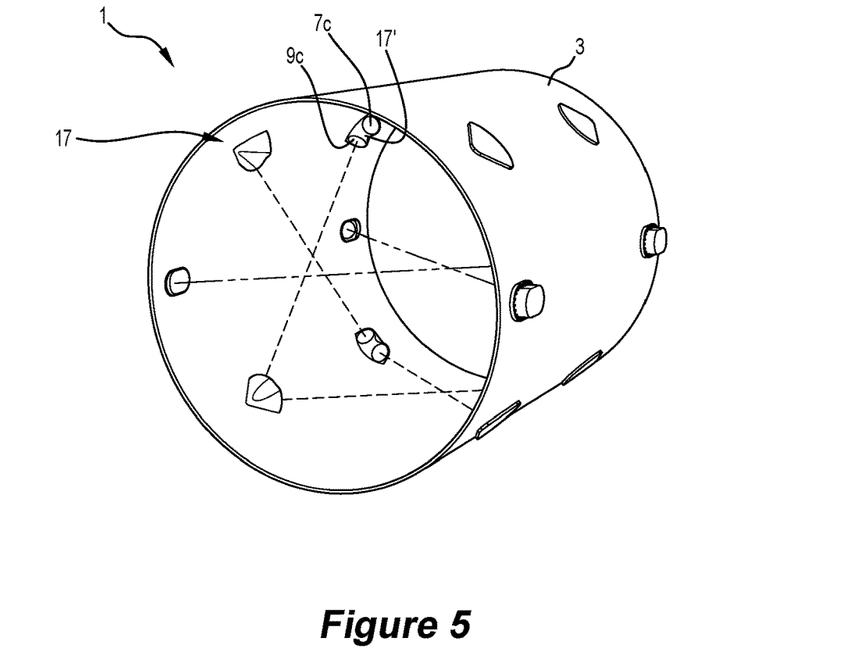
FIG. 5 is a perspective view of another assembly for a flow meter.
Figure 6:
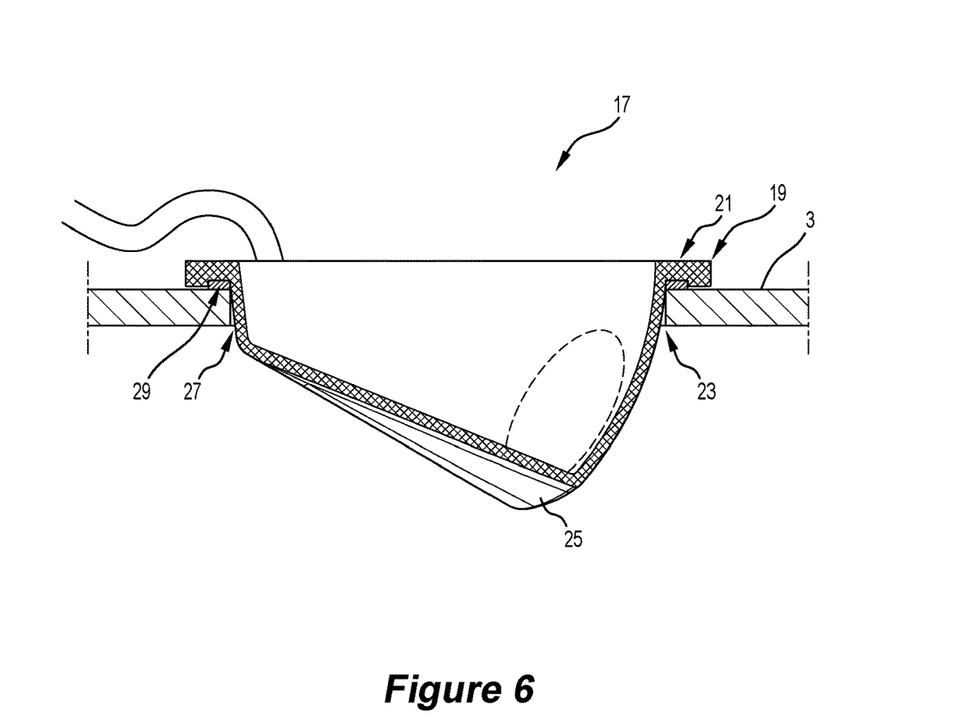
FIG. 6 is an axial cross-section view of an installed transducer unit for the assembly of FIG. 5.

Some constructional advantages arising from this arrangement of transducers are best illustrated in respect of the exemplary arrangement of FIGS. 5 and 6. For convenience, reference numerals for components analogous to those in FIGS. 1 to 4 have been carried over.

Each adjacent pair of transducers may be mounted within a single transducer unit, e.g. a transducer unit 17' may carry the transducers 7c, 9c. As such, eight mutually identical transducer units may be mounted to place the sixteen transducers of the sets 7, 9, 11, and 13, e.g. the illustrated unit 17 is identical to the unit 17'.

The transducer unit 17 also includes a mounting arrangement in the form of a mounting plate 19 by which the unit 17 is mountable as a unit and in association with the tubular interior of the body 3. The mounting plate 19 is curved to complement the exterior of the body 3 and has an arrangement of through holes 21 through which suitable fasteners may be passed to engage complementary holes 23 formed in the wall of the body 3, whilst a transducer-carrying portion 25 of the unit projects through a complementary opening 27 through the wall of the body 3. Transducer-carrying portion 25 contains a pair of transducers, for example, transducers 7c, 9c directed at the required angles for operation. A gasket 29 encircles the opening 27 and is compressed to seal against the leakage via the opening 27.

With suitable adjustments to the mounting arrangement, the same transducer unit 17 may be used in pipes of differing diameter.

Figure 7:
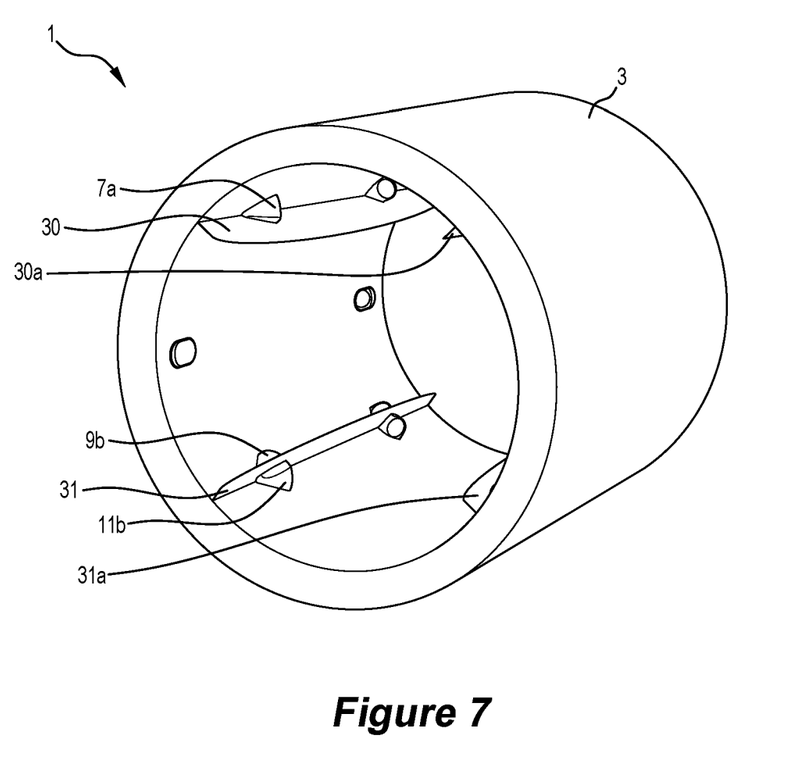
FIG. 7 is a perspective view of another assembly for a flow meter.

FIG. 7 illustrates another example of the assembly 1 in which mutually adjacent acoustic transducers are separated from each other by flow-separating fins. In this example the flow-separating fins run parallel to the tubular interior of the housing 3, e.g. the fin 30 mutually separates the transducers 7a, 9a whilst the fin 31 mutually separates the transducers 9b, 11b. The fins straighten the flow and limit swirl and cross-flow effects. Similar fins 30a and 31a are located opposite to fins 30 and 31. Fins 30, 31, 30a and 31a can be any suitable shape and typically extend beyond the height of the transducers to better straighten the water flow.

Figure 8:
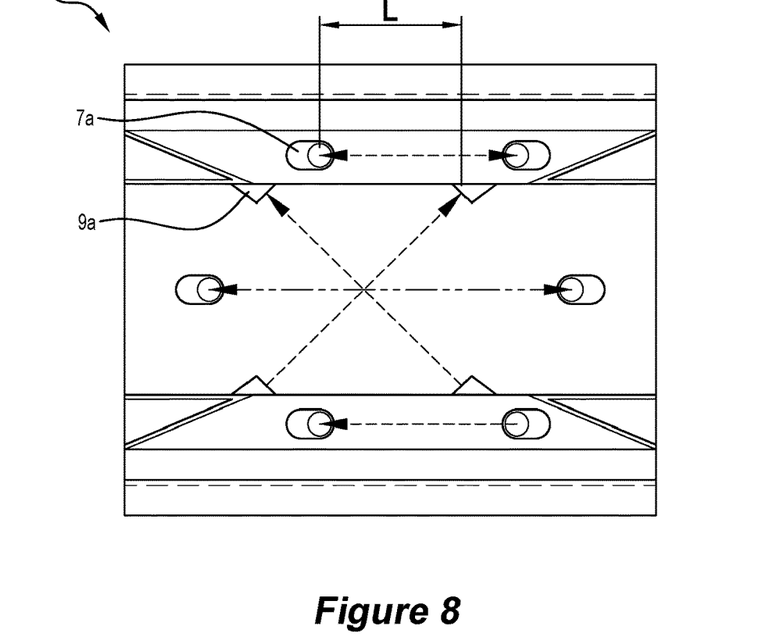
FIG. 8 is an axial cross-section view of another assembly for a flow meter.
Figure 9:
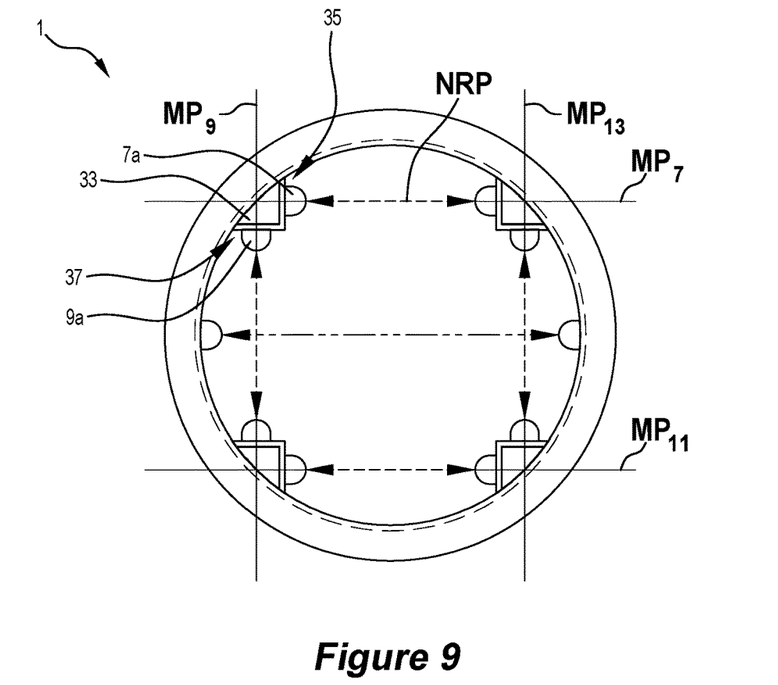
FIG. 9 is an end view of the assembly.

Other forms of flow-separating structure are possible. In the example of FIGS. 8 and 9, the transducers 7a, 9a are separated by a flow-separating structure in the form of a lengthwise projection 33 which defines a mounting face 35 substantially perpendicular to the top edge of the notional rectangular polygon NRP and on which the transducer 7a is mountable. The projection 33 likewise defines a mounting face 37 for the transducer 9a and substantially perpendicular to the side edge of the polygon NRP. This construction enables a common transducer and transducer mounting arrangement to be employed at all sixteen points of the sets.

Figure 10:
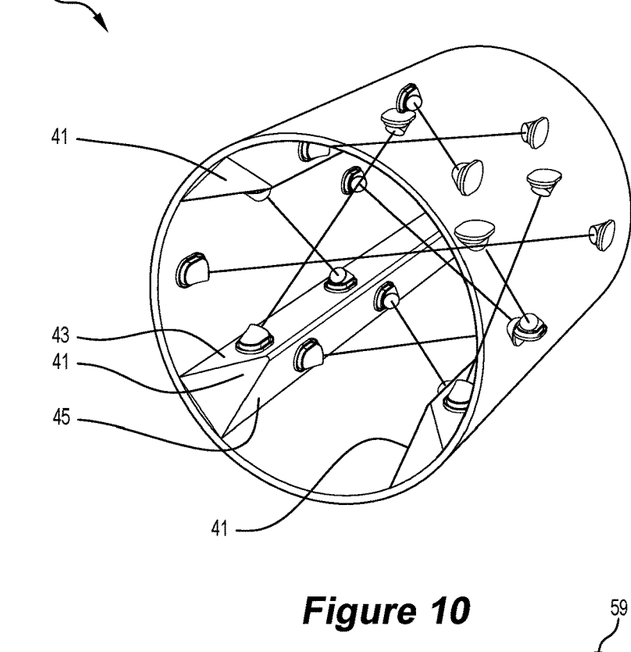
FIG. 10 is a perspective view of the assembly of FIG. 9.

A similar effect could be achieved if each transducer mounting face had some other (i.e. non-perpendicular) common orientation as shown in FIG. 10 relative to the corresponding portion of the notional rectangular polygon. In FIG. 10 lengthwise projections 41 have angled mounting faces 43, 45 as opposed to the perpendicular mounting faces 35, 37 of FIG. 9.

In the examples of FIGS. 1 to 7, each of the acoustic paths spans a respective stream wise distance and as such each pair of mutually facing acoustic transducers includes an upstream transducer and a downstream transducer, e.g. the pair 9b, 9c includes the upstream transducer 9b upstream of the downstream transducer 9c.

In the examples illustrated thus far, the upstream transducers lie in a common plane transverse to the interior of the body 3 whilst the downstream transducers lie in another common transverse plane. This commonality is not essential. As illustrated in FIGS. 8 to 9, the mutually adjacent transducers such as transducers 7a, 9a can be axially offset from each other. Preferably the acoustic paths intersect with at least one common plane transverse to the tubular cavity of the body 3—i.e. preferably the dimension L of FIG. 8 is at least zero.

Figure 12:
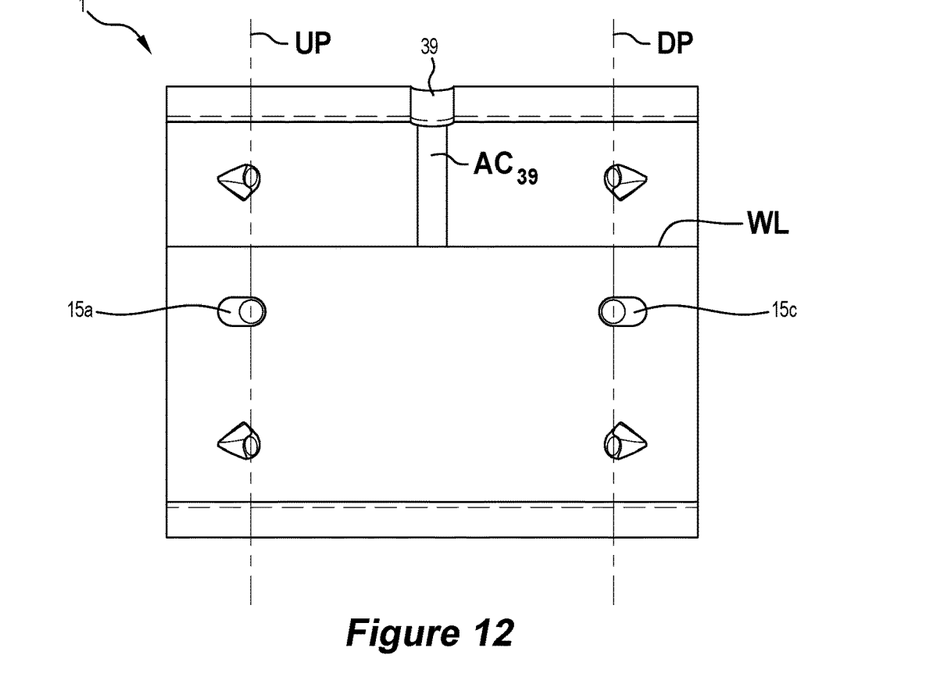
FIG. 12 is a vertical axial cross-section view of another assembly for a flow meter.
Figure 13:
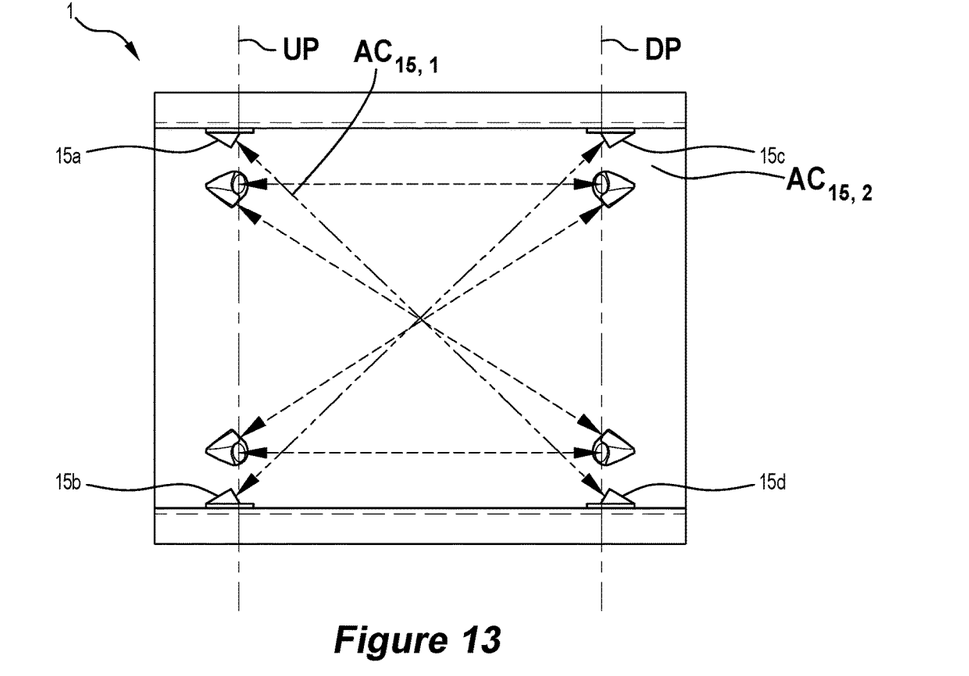
FIG. 13 is a horizontal axial cross-section view of the assembly.

FIGS. 12 and 13 illustrate an assembly, for a flow meter, akin to the assembly of FIG. 1. Relative to the variant of FIG. 1, the further acoustic sensors 15a, 15b, 15c, 15d have been moved axially inwards towards the center of the arrangement so that they lie in the upstream and downstream planes UP, DP in which the acoustic transducers of the sets also reside. This movement reduces the overall length of the flow sensing arrangement. This movement results in the acoustic paths $AC_{15,1}$, $AC_{15,2}$ crossing at an angle other than the conventionally preferred 90°. Nonetheless, in conjunction with output from the acoustic transducers of the sets, accurate flow measurements can be obtained.

The arrangement of FIG. 12 further includes a water level sensor 39 for sensing the water level WL in the pipe. In this example the sensor 39 is a top-mounted acoustic sensor which sends signals along, and receives reflected signals from, a vertical acoustic path $AC_{39}$. Other water level sensing arrangements are possible, e.g. a floor-mounted sensor might be provided. The water level could be expressed in terms of height above the bottom of the pipe, or in terms of height below the overt of the pipe, or in other terms.

Preferred forms of flow meter process the data from the acoustic transducers and also, from the sensor 39 to enable flow measurement in pipes when they are full and also when they are only partially full.

Figure 11:
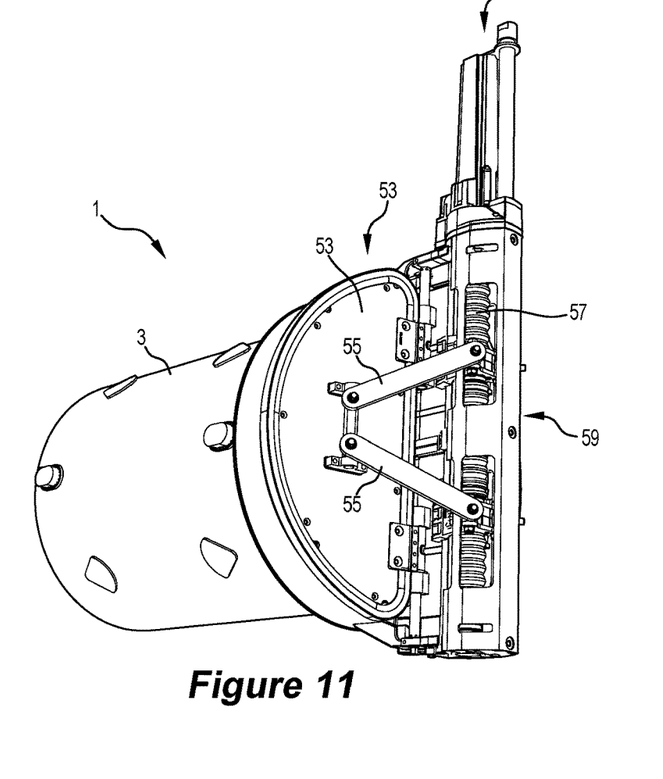
FIG. 11 is a perspective view of the assembly shown in FIG. 1 with a bi-fold valve attached thereto.
Figure 14:
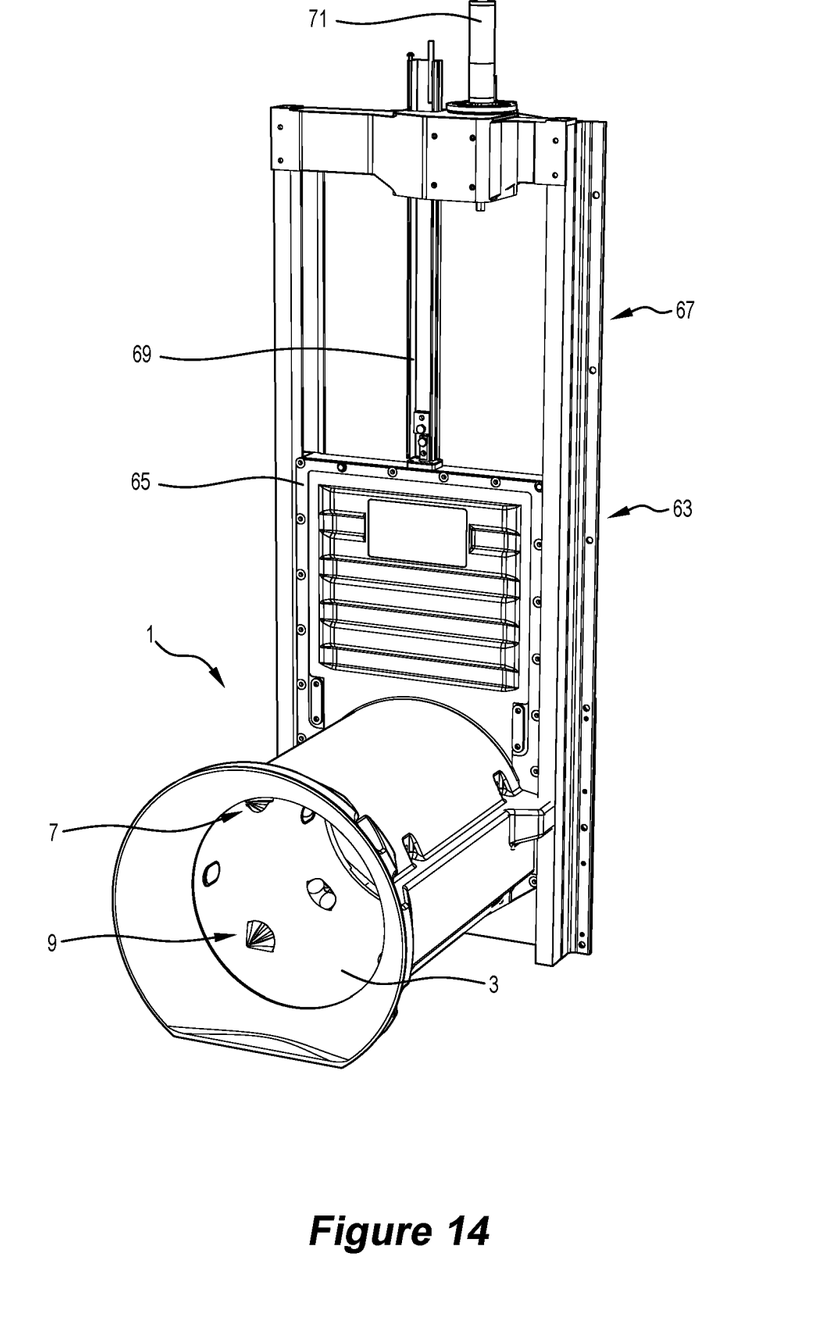
FIG. 14 is a perspective view of the assembly shown in FIG. 1 with a knife gate valve attached.

The examples shown in FIGS. 1 to 10 and 12 to 13 relate to the inline flow measurement through a body or pipe 3. The embodiments can also include the attachment of a flow control device or gate to allow the passing of water therethrough. Such devices can be installed anywhere along pipe 3, or at the end thereof, depending on requirements. FIGS. 11 and 14 show the use of typical flow control devices used in the field but are not limited to such devices as would be understood by the man skilled in the art.

FIG. 11 has a bi-fold gate 51 secured to the end of pipe 3. Such a gate is fully described in the embodiments discussed in Australian Patent No. 2012234917, the contents of which are herein fully incorporated to avoid repetition and duplication of description for the reader. A pair of hinged sealable semi-circular plates 53 (only one of which is visible in FIG. 11) can be lifted and lowered by pivotable struts 55 journaled to a rotatable threaded member 57 contained in an activation device 59. A motor 61 will rotate threaded member 57 under program control. Motor 61 may also be replaced by a hand crank, if required.

FIG. 14 has a knife gate valve 63 secured to the end of pipe 3. Such a valve is fully described in the embodiments discussed in International Patent Application Nos. WO 2011/020143 and WO 2016/004471, the contents of which are herein fully incorporated to avoid repetition and duplication of description for the reader. A gate leaf 65 sealingly slidable within a frame 67 can be lifted and lowered by lifting mechanism 69 connected to frame 67. A motor 71 will operate under program control to lift and lower gate leaf 65. Motor 71 may also be replaced by a hand crank, if required.

The skilled person will appreciate that the present teachings can be extended well beyond the described examples. The invention is not limited to the described examples; rather it is defined by the claims. By way of example, some variants may do without the set 15, and whilst in this example the measurement planes of the sets are parallel to the interior of the tubular body, in other variants this may not be so.

In this example, there are ten mutually facing pairs of acoustic transducers corresponding to ten acoustic paths. This arrangement has been found to lead to measurements of flow less impacted by cross-flow effects, and other aspects of turbulence, than other flow-measuring arrangements. Of course, the disclosed principles can be extended beyond a notional square to other regular polygons, e.g. to notional regular polygons in the form of pentagons or pentagrams, in which case similar computational and constructional benefits could be realised.

The invention claimed is:

1. An arrangement of acoustic transducers in a flow meter used in water irrigation, the flow meter providing measurement of a rate at which water is flowing, the arrangement comprising:
   a respective transducer set for each edge of a notional regular polygon, the transducer sets being mounted in a tubular cavity to carry the water, each of the transducer sets respectively including:
      two acoustic transducers oriented to provide only a single acoustic path with each other and lying in a measurement plane of the respective set; and
      another two acoustic transducers oriented to provide only another single acoustic path with each other and lying in the measurement plane of the respective set;
      the transducer sets being positioned so that, in a cross-section normal to the tubular cavity, the measurement plane of each respective transducer set is coincident with a respective edge of the notional regular polygon;
   transducer units, each respective one of the transducer units carries two of the acoustic transducers and includes:
      a mounting arrangement by which the respective one transducer unit is mounted as a unit inside a wall of the tubular cavity;
      a mounting plate, which is curved to complement an exterior of the wall of the tubular cavity; and
      a transducer-carrying portion projecting through a complementary opening through the wall of tubular cavity.

2. The arrangement of claim 1 wherein the acoustic path of each respective set substantially crosses the other acoustic path of the respective set.

3. The arrangement of claim 1, wherein the acoustic path of each respective set is substantially perpendicular to the other acoustic path of the respective set.

4. The arrangement of claim 1, wherein the notional regular polygon is substantially concentric to the tubular cavity.

5. The arrangement of claim 1, wherein the notional regular polygon is convex.

6. The arrangement of claim 1, wherein the regular polygon is a square.

7. The arrangement of claim 1, wherein the measurement planes are substantially parallel to the tubular cavity.

8. The arrangement of claim 1, further comprising four acoustic transducers oriented to define two acoustics paths lying in a plane coincident with a center line of the tubular cavity.

9. The arrangement of claim 8 wherein each upstream acoustic transducer, of the sets and of the further four acoustic transducers, lies in an upstream plane transverse to the tubular cavity; and
each downstream acoustic transducer, of the sets and of the further four transducers, lies in a downstream plane transverse to the tubular cavity.

10. An arrangement of hardware including the arrangement of claim 1 and a sensor for sensing a level of the water in the tubular cavity.

11. An assembly for a flow meter including the arrangement of claim 1 and a body defining the tubular cavity and carrying the acoustic transducers.

12. The assembly of claim 11, wherein the body defines a respective mounting face portion for each of the acoustic transducers of the sets; each of the mounting face portions being substantially normal to a respectively corresponding edge portion of the notional regular polygon.

13. A flow meter including the arrangement of claim 1 and a logic arrangement for applying logic to outputs from the transducers to produce an indication of the rate at which the water is flowing.

14. The flow meter of claim 13 wherein the logic is at least partly determined by system identification.

15. A flow control unit including the flow meter of claim 13; and a flow control barrier to control movement of water therewithin.

16. The flow control unit of claim 15 wherein said flow control barrier is a knife gate valve.

17. The flow control unit of claim 15 wherein said flow control barrier is a bi-fold gate valve.

18. A transducer unit for a flow meter, the flow meter being for measuring a rate at which water is flowing; the transducer unit comprising:
a first acoustic transducer to send signals along, and receive signals from, an acoustic path;
a second acoustic transducer to send signals along, and receive signals from, another acoustic path; and
a mounting arrangement by which the transducer unit is mountable as a unit and in association with a tubular cavity for carrying the water;
a mounting plate, which is curved to complement an exterior of a wall of the tubular cavity; and
a transducer-carrying portion projecting through a complementary opening through the wall of tubular cavity;
the acoustic paths mutually diverging away from the transducer unit at orientations, relative to the mounting arrangement, such that an upstream at least three of the transducer units is co-operable with a downstream at least three of the transducer units; and
a body defining the tubular cavity to form an arrangement of acoustic transducers, including the first and second acoustic transducers, the arrangement of acoustic transducers comprising:
a respective transducer set for each edge of a notional regular polygon, the transducer sets being mounted in the tubular cavity to carry the water, each of the transducer sets respectively including:
two acoustic transducers of the arrangement of acoustic transducers, which are oriented to provide only a single acoustic path with each other and lying in a measurement plane of the respective set; and
another two acoustic transducers of the arrangement of acoustic transducers, which are oriented to provide only another single acoustic path with each other and lying in the measurement plane of the respective set;
the transducer sets being positioned so that, in a cross-section normal to the tubular cavity, the measurement plane of each respective transducer set is coincident with a respective edge of the notional regular polygon.

* * * * *